Nov. 3, 1931.  L. B. ERWIN  1,830,534
ANTISKID DEVICE FOR AUTOMOBILES
Filed April 9, 1930
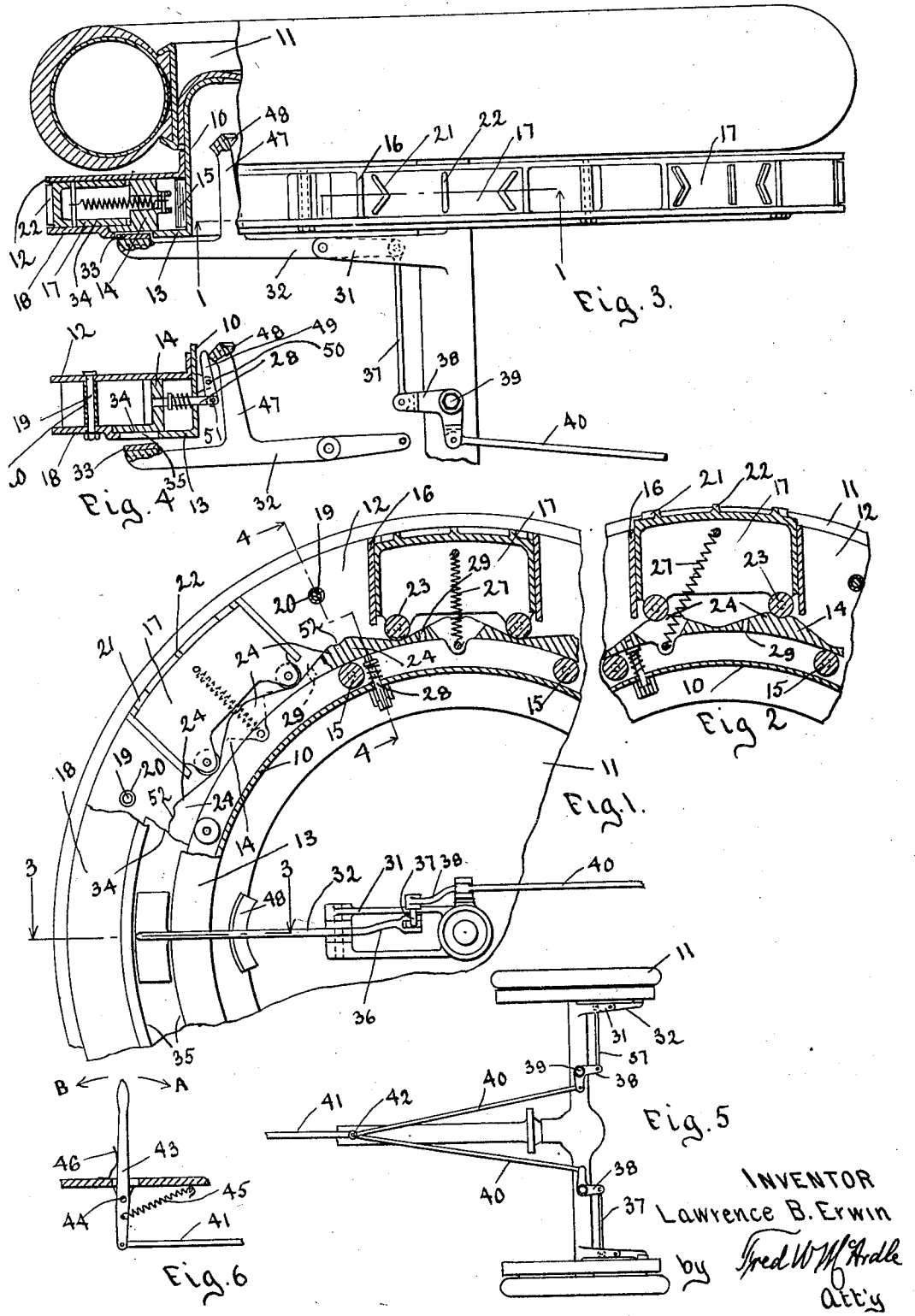
INVENTOR
Lawrence B. Erwin
by Fred W. McArdle
Att'y Patented Nov. 3, 1931

1,830,534

UNITED STATES PATENT OFFICE

LAWRENCE B. ERWIN, OF MARBLEHEAD, MASSACHUSETTS, ASSIGNOR TO HENRY H. ELLSWORTH, OF COHASSET, MASSACHUSETTS

ANTI-SKID DEVICE FOR AUTOMOBILES

Application filed April 9, 1930. Serial No. 442,799.

My invention relates to anti-skid devices for automobiles, and particularly to the class in which the anti-skid elements may be operated to function by connections within the reach of the driver's seat.

The object of my invention is to provide a device of this character, which may be controlled in functioning by the driver of an automobile, without moving from the driver's seat, and which may be operated to function when the need arises, and to be released from functioning when the need ceases.

With anti-skid devices now in common use, it is necessary to apply them to the wheels of the automobile when atmospheric or road conditions are such that they may be needed, and this is done previous to leaving the garage, or on the road when it seems advisable. At best, the application is liable to entail soiled clothing or soiled hands, and consequently it often occurs that at moments of need, the wheels are without anti-skid protection. In many cases, the need for anti-skid devices is only on short stretches of road, even in the winter, as the main travelled roads soon are in condition for safe driving without such devices, and when general conditions indicate the need or possible need, and the devices are applied, the intervals in which they are not needed for safe driving are greatly in excess of the intervals when they are actually functioning for the set purpose. The result of such use is excessive wear on the anti-skid elements, and frequent breaking entailing annoyance to the occupants of the vehicle, until such time as the broken element can be replaced. The application of these devices, and the renewal of broken elements can not be done with facility, and many drivers prefer to take chances, often with serious results, rather than to submit to the annoyance experienced in their use.

My invention is of a character that obviates these difficulties, and may be applied to cars of the present models, without radical changes, for use when and if the emergency arises when an anti-skid device is required.

My invention consists in the novel construction and operation of the device to accomplish the object stated.

In the accompanying specification and claims, and the drawings forming a part thereof, I have described and illustrated a preferred form of my invention but may modify both the construction and operation according to conditions and within the scope of the claims.

In the drawings,

Fig. 1 is a sectional fragment substantially on the line 1—1, Fig. 3, embodying my invention, the anti-skid elements being shown in non functioning relation to the tread of the wheel.

Fig. 2, is a fragment showing one anti-skid element in functioning position, a section being taken on its median line.

Fig. 3 is a sectional elevation to agree with Fig. 1, the sectioned portion being substantially on the line 3—3, Fig. 1.

Fig. 4 is a fragment showing the action of the releasing means, a section of the anti-skid device being taken substantially on the line 4—4, Fig. 1, as in position to be engaged by the releasing means.

Fig. 5 is a diagrammatic plan, and Fig. 6 a diagrammatic fragment, together illustrating the connections and operating means.

Referring to the drawings, my device is supported by means of a flanged element 10, secured to the driving wheel 11, each wheel being provided with a complete device.

The element 10 extends inwardly from the wheel and forms a shelf concentric with the axis thereof. Rigid with this shelf and adjacent to the inner side of the shoe of the wheel is a wall 12, a flange 13 being formed on the element 10 to constitute a channelled member, in which elements to be described, operate to produce the results required. Mounted in this channelled member, and between the walls 12—13, is a cam ring 14 which will be presently described. This ring is movable, concentric with the axis of the wheel, antifriction rolls 15, or other suitable means being provided to insure a suitable bearing. Formed on the outer periphery of this ring are a plurality of cams agreeing with the number of anti-skid units in their position, and adapted to function in the manner and for the purpose to be presently described. Extending inwardly from the wall 12 are a plurality of ribs 16, arranged in pairs and providing bearings for antiskid units 17, which are slidable between the respective pairs of ribs, and between the wall 12, and a cover plate 18, secured to the plate 12 in a suitable manner, here shown by bolts 19, and spacer bushings 20, nuts securing the plate removably in a position concentric with the axis of the wheel. There is thus formed a plurality of pockets in which the respective anti-skid elements may slide radially. These elements are box like in form, the end adapted to engage the roadway being formed with suitable projections 21, 22, for better tractive results.

The opposite end is provided with anti-friction rolls 23, mounted near the longitudinal wall of the element. The cams 24 with which these rolls engage are formed integral with the ring 14, and are so disposed that the rolls of each anti-skid unit, engage successive cams, the relation of the units and the cams 24, being such that there is a like cam acting on each roll of the respective anti-skid units.

The spacing of the cams 24 on the rings is such that the individual rolls bear in like relation on their respective cams, and it therefore follows that if the ring be rotated relative to the wheel and the anti-skid units, that the rolls will ride uniformly on their respective cams, and the several units will be moved in their bearings. Normally the rolls bear on the low part of the respective cams, a spring 27 secured to each unit and to the cam ring exerting yielding radial tension to retain the units in withdrawn position. When the ring is rotated by means to be presently described, the cams act on the rolls to advance the several units beyond the line of the tread of the wheel, and the tractive projections 21, 22 engage the road and bear the weight previously distributed over a considerable area of the shoe, serving to prevent skidding.

Mounted slidably in the member 10 is a spring supported lock pin 28, the inner end of which is in yielding engagement with the inner periphery of the cam ring 14, which is provided with suitable sockets 29, with which the pin may engage when the ring is rotated to advance the anti-skid units, as shown in Fig. 2. My invention is adapted to operate equally well with either a forward movement of the car or when the car is in reverse, the lock pins engaging corresponding sockets according to the direction in which the cam ring is moved, and serving to limit such movement to prevent over travel. When the units are in advanced position, the action of the springs 27 on each of the units, is such that when the lock pin is withdrawn from its socket, and the rotating means for the cam is removed from action, the units will be returned to initial position withdrawn from contact with the road.

The cam ring is operated in the following manner to advance the anti-skid elements to functioning position. Swiveled to the housing of the rear shaft of the particular wheel, in a suitable forked extension 31, is a lever 32, extending toward the periphery of the wheel and provided with a friction pad 33, which is adapted to engage the wall 34 formed on the cam ring 14. The flange 13 and the concentric cover plate 18, are so disposed that an opening 35 extending about the flange, exposes this wall permitting the friction pad to engage therewith when it is actuated by means which I will now describe. The lever 32 is inwardly extended at 36 and connected by means of the link 37, with a bell crank 38, journaled on a stud 39 projecting from the rear shaft housing. A connection 40 is swiveled to the other arm of the bell crank, is swiveled at its other end to the reach rod 41, the bell cranks of the devices for both wheels being swiveled to the same reach rod as at 42. This reach rod is extended forward as shown in Figs. 5 and 6, and is hinged to the hand lever 43, journaled in a fork secured to the under side of the flooring of the car as at 44. This lever extends through the flooring within easy reach of the driver of the car. A spring 45 retains this lever yieldingly in a position in which the anti-skid elements are out of functioning position, the lever being limited in movement under the tension of this spring, by a leaf spring 46, the purpose of which will be presently explained. When it is desired to operate the anti-skid elements to function, the lever is moved in the direction of the arrow A, and through the intermediate connections, the friction pads pertaining to the devices on both wheels, are engaged with the walls of the respective cams.

The frictional engagement retards the rotation of the cam ring relative to the rotation of the wheel, and the rolls 23 of the several anti-skid elements ride to the high point of the respective cams advancing the elements to a position where the projections 21, 22 are beyond the line of the periphery of the wheel to which they pertain, the lock pin 28 engaging the socket depending on the direction in which the car is moving. Extending from the lever 32 is an arm 47 formed with a flange 48 adapted to engage one end of a lever 49 hinged to the element 10 at 50, the other end being hinged to the lock pin 28 as at 51, Fig. 4. When the hand lever is in initial position as shown in Fig. 6, or in position in which the friction pad engages the cam ring, this flange is out of the path of the lever 49 as it rotates with the wheel. When however it is desired to release the lock pin to permit the anti-skid elements to return to non-functioning position, the hand lever is moved in the direction of the arrow B against the tension of the leaf spring 46, and through the intermediate connections, the edge of the flange 48 is swung to a position in which the lever end 49 will engage therewith and the pin 28 will be withdrawn from the socket 29, permitting the cam ring 14 to rotate to initial position under the tension of the springs 27, which also function to withdraw the anti-skid elements. I prefer to provide a slight depression in each cam at its high point as shown at 52, in which the rolls 23 may socket, but of a depth which will not interfere with the action of the springs to return the elements to initial position, but this is not an essential feature, as the lock pins provide ample means for securing the cam rings in operative position.

Having thus described my invention, I claim:

1. In an anti-skid device for automobiles, having as elements a plurality of tractive elements rotatable with a wheel, and adapted to be operated radially therewith to engage the surface of the road; a member rotatable with the wheel, and relatively rotatable therewith, and provided with a plurality of cams in engagement with and adapted to move the respective anti-skid elements radially to project beyond the line of the periphery of the wheel; means for retarding the rotation of the ring relative to the rotation of the wheel from an initial position and within predetermined limits in either direction, depending on the direction of rotation of the wheel; means adapted to automatically engage with the cam member, to lock it in position in which the anti-skid elements are in functioning position; means under control of the driver of the automobile, whereby the cam member may be released; and means for returning it to initial position.

2. In an anti-skid device for automobiles, having as elements a plurality of tractive elements rotatable with a wheel, and adapted to be operated radially therewith to engage the surface of the road; a member rotatable with the wheel and relatively rotatable therewith, and provided with a plurality of cams in engagement with and adapted to move the respective anti-skid elements radially to project beyond the line of the periphery of the wheel; a friction element, adapted to be engaged with the cam member for the purpose of retarding the rotation of the ring relative to the rotation of the wheel, from an initial position and within predetermined limits in either direction depending on the direction of the rotation of the wheel; means operative on the friction element for controlling its engagement with the cam element; means adapted to automatically engage with the cam member, to lock it in position in which the anti-skid elements are in functioning position; means under the control of the driver of the automobile whereby the engagement of the friction element with the cam member may be controlled; and cooperative means controlled by the same connections whereby the cam member may be released from locked position, and permitted to return to initial position.

LAWRENCE B. ERWIN.